United States Patent [19]

Ballu

[11] 4,083,494

[45] Apr. 11, 1978

[54] PLANT PERMITTING SPRAYING PROPORTIONING TO THE SPACE COVERED, APPLICABLE IN PARTICULAR TO AGRICULTURAL SPRAYERS

[75] Inventor: Vincent Pierre Marie Ballu, Epernay, France

[73] Assignee: Tecnoma, Epernay, France

[21] Appl. No.: 656,262

[22] Filed: Feb. 9, 1976

[30] Foreign Application Priority Data

Feb. 7, 1975 France .............................. 75 03877
Jan. 21, 1976 France .............................. 76 01557

[51] Int. Cl.² .............................................. B05B 9/06
[52] U.S. Cl. .................................... 239/156; 239/170
[58] Field of Search ............... 239/155, 156, 72, 170; 137/47; 417/15, 24; 222/178

[56] References Cited

U.S. PATENT DOCUMENTS

| | | | |
|---|---|---|---|
| 2,031,262 | 2/1936 | Hill, Jr. ............................ | 239/156 X |
| 3,344,993 | 10/1967 | Wilder et al. ..................... | 239/156 X |
| 3,693,838 | 9/1972 | Haker et al. ...................... | 239/155 X |
| 3,782,634 | 1/1974 | Herman ................................. | 239/156 |
| 3,792,709 | 2/1974 | Johnson, Jr. ..................... | 239/156 X |
| 3,853,272 | 12/1974 | Decker et al. ...................... | 239/155 |

*Primary Examiner*—John J. Love
*Attorney, Agent, or Firm*—Gordon W. Hueschen

[57] ABSTRACT

A spraying plant the output of which can be made proportional to the rate of advance, comprises a source of power such as the power take off of a farming tractor, a positive displacement pump adapted to be driven from said source of power, a controlling member, such as a wheel, the rotation speed of which is proportional to said rate of advance, variable transmission means adapted to transmit power from said source to said pump and electronic regulating means controlled by said member for adjusting said variable transmission means whereby a predetermined quantity of product can be sprayed by unit area. The transmission means can be incorporated to the pump.

9 Claims, 4 Drawing Figures

FIG.: 1

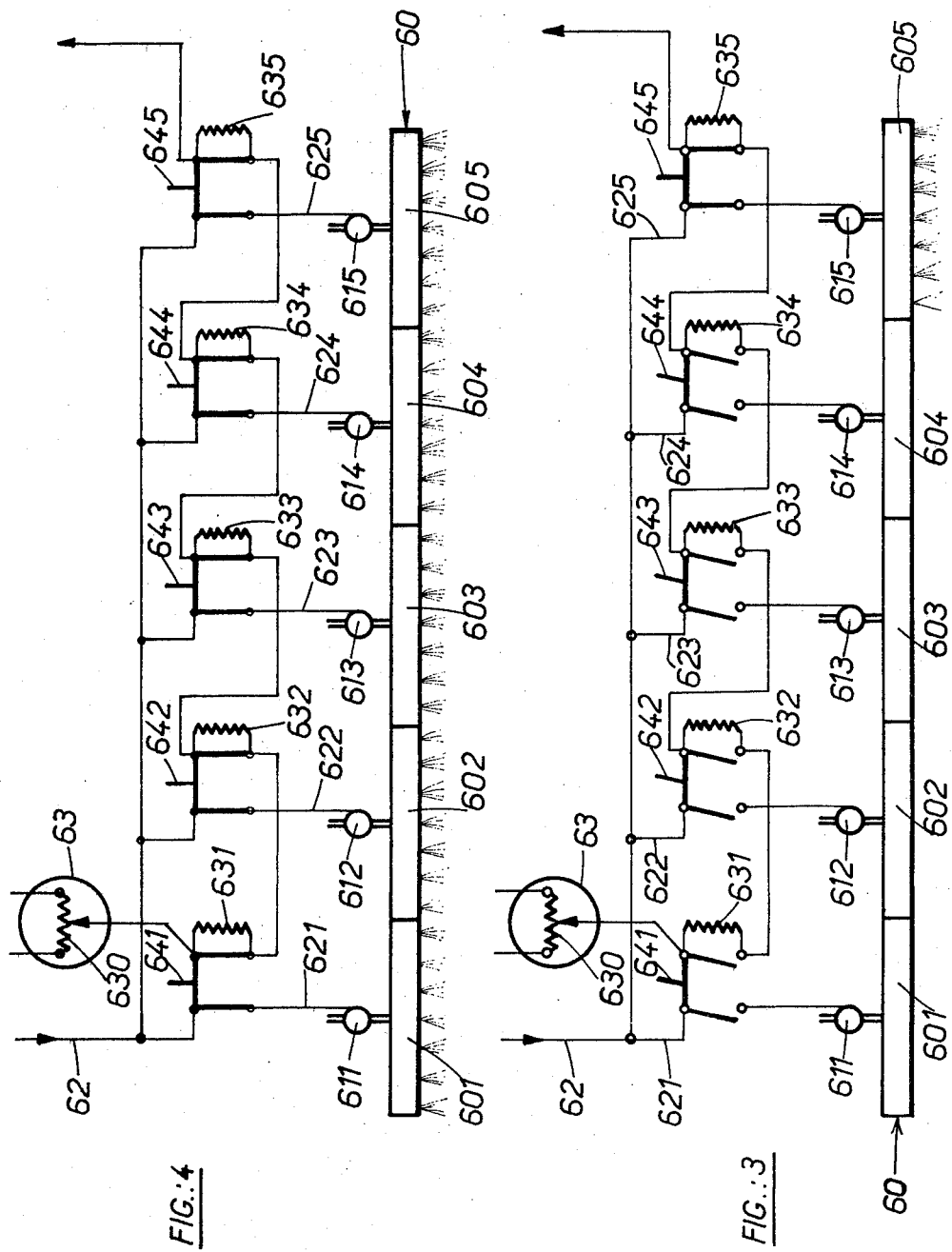

PLANT PERMITTING SPRAYING PROPORTIONING TO THE SPACE COVERED, APPLICABLE IN PARTICULAR TO AGRICULTURAL SPRAYERS

The present invention relates to sprayers which are intended in particular for agricultural applications and the output of which can be made proportional to the rate of advance in order to enable a predetermined volume of product to be sprayed per unit area.

In the oldest types of sprayers of this kind, the pump which delivers the product to be sprayed was driven by a wheel of the vehicle carrying the sprayer, through a mechanical transmission train. This was the principle on which the old animal-drawn sprayers were based.

Four major drawbacks stem from application of this principle:

1. the power which the wheel can supply, and hence the spraying pressure, is limited by wheel adhesion to the ground;
2. the proportionality of the output can be unreliable because of often barely perceptible slipping, or even skidding, of the wheel on the ground;
3. a gear change system must be interposed between the wheel and the pump to enable the output to be varied, thereby making such variation in output complex and often costly to achieve,
4. such sprayers are unable to operate when the vehicle is stationary and, as already stated, are incapable of operating at high pressure.

In order to alleviate the drawbacks of the above-described appliances, recourse has been had to a system in which the sprayer pump, which requires substantial power, is driven by the tractor's power take-off but in which pump delivery is controlled by a device driven by a wheel of the appliance and whose action is proportional to the rate of advance.

Two drawbacks still subsist, however:

1. a gear change system is still required between the wheel and the regulator drive;
2. the power required by the regulating device is by no means negligible an is likewise limited by wheel adhesion.

In point of fact, these latter sprayers, like the former, have a limited working pressure that precludes their use for certain cultivations requiring high pressure delivery.

It is the main object of the present invention to overcome the aforementioned drawbacks of prior art sprayers and to accordingly provide a spraying plant in which the pump or pumps which deliver the product to be sprayed are driven from the power take-off on the tractor or other appliance transporting the sprayer, through a variable drive train which is preferably a hydrostatic system comprising a variable-output generator, a hydraulic motor and an electrically operated valve for governing the generator output, the transmission ratio of said drive train being determined by an electronic regulating device controlled by a member such as a wheel of the tractor or appliance, or a feeler wheel the rotation speed of which is proportional to the rate of advance.

Thus the rotation speed of the pump or pumps, i.e. the sprayer output, is directly proportional to the rate of advance whereas the power needed to drive said pump(s) is supplied by the power take-off and consequently does not depend on wheel adhesion. The wheel or its equivalent merely transmits an electrical information signal requiring virtually no power, and thus no longer tends to slip or skid, thereby ensuring great fidelity of the control function.

In a particularly simple form of embodiment of the invention, the variable transmission can be incorporated in or combined with the pump itself, through the use for example of a dual-piston pump equipped with a swashplate the skew angle of which is controlled by the electronic regulator according to the desired output.

This invention is likewise applicable to plants consisting of multiple spray rails comprising separately fed individual rails, whereby to provide a constant output per unit area irrespective of the number of individual rails activated.

The description which follows with reference to the accompanying non-limitative exemplary drawings will give a clear understanding of how the invention can be carried into practice.

In the drawings:

FIGS. 3 and 4 are diagrammatic portrayals of an application of the invention to a plant with multiple sprayrails.

Figure 1:
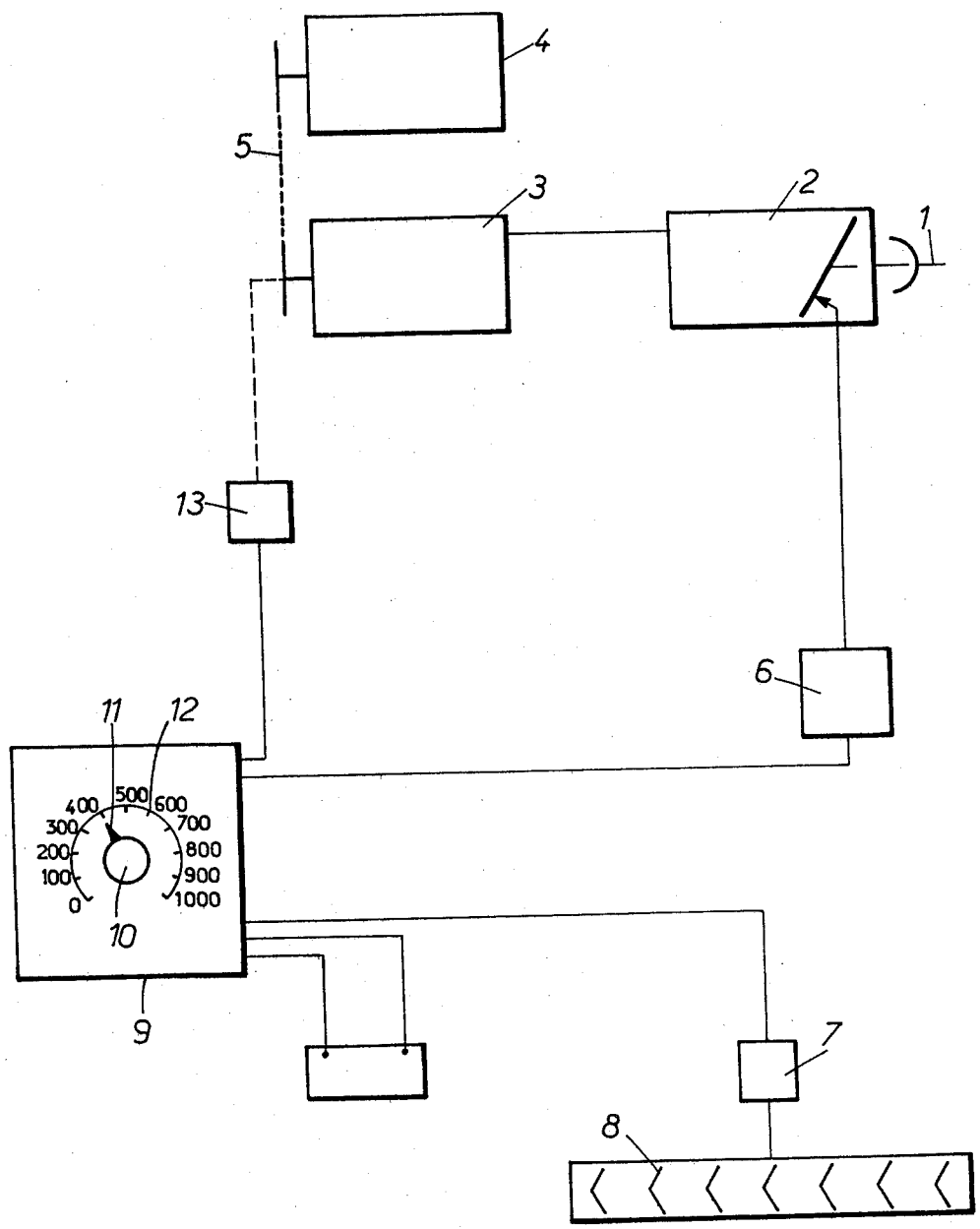
FIG. 1 is a block diagram of a first embodiment of a spraying plant according to the invention.

In the embodiment shown in FIG. 1, the power circuit, which is activated by the power take-off 1 of a tractor (not shown), includes a hydrostatic system comprising a variable-flow generator 2, for instance of the kind having plungers and a swashplate driven by said power take-off, and a hydraulic receiver motor 3 coupled to the spray pump(s) 4 through any convenient drive train 5.

The tractor power take-off 1 supplies all the power required to rotate the generator 2 but the output from same is governed by an electrically operated valve 6 by means of which the stroke of the generator plungers may be controlled for example.

In the absence of any impulse from electrically operated valve 6, generator 2 rotates under no load; conversely, it rotates for maximum output when it receives a maximum impulse.

Valve 6 is part of a control circuit further comprising a tacho-generator 7 driven by a member which rotates at a speed proportional to the rate of advance of the sprayer, an example of such member being a wheel 8 of the tractor or a "feeler" wheel.

Tacho-generator 7 energizes an electronic regulating device 9 which supplies electrically operated valve 6 with pulses the number of which is proportional to the voltage delivered by tacho-generator 7. Consequently, the faster wheel 8 rotates, the more the voltage from the tacho-generator increases, the greater the number of pulses received by valve 6 and the greater the output from hydraulic generator 2.

Regulating device 9 includes switchable circuits which may be placed in or out of circuit by control means 10, thereby to adjust the flow from the pumps to the required value. Such control means possibly include a pointer 11 movable before a dial 12 graduated, say, in liters of product sprayer per unit area.

Thus an ordinary button on the tractor dashboard allows adjusting the volume of product sprayed per unit area irrespective of the rate of advance.

Accuracy of control is provided by a monitoring circuit comprising a tacho-generator 13 which is driven by the hydraulic motor 3 actuating the pumps 4 and which inputs into control device 9. The latter is devised so as to check that motor 3 is rotating at the required speed and to correct possible deviations therefrom, it being possible to achieve precision to within ±3%, which is extremely good.

Figure 2:
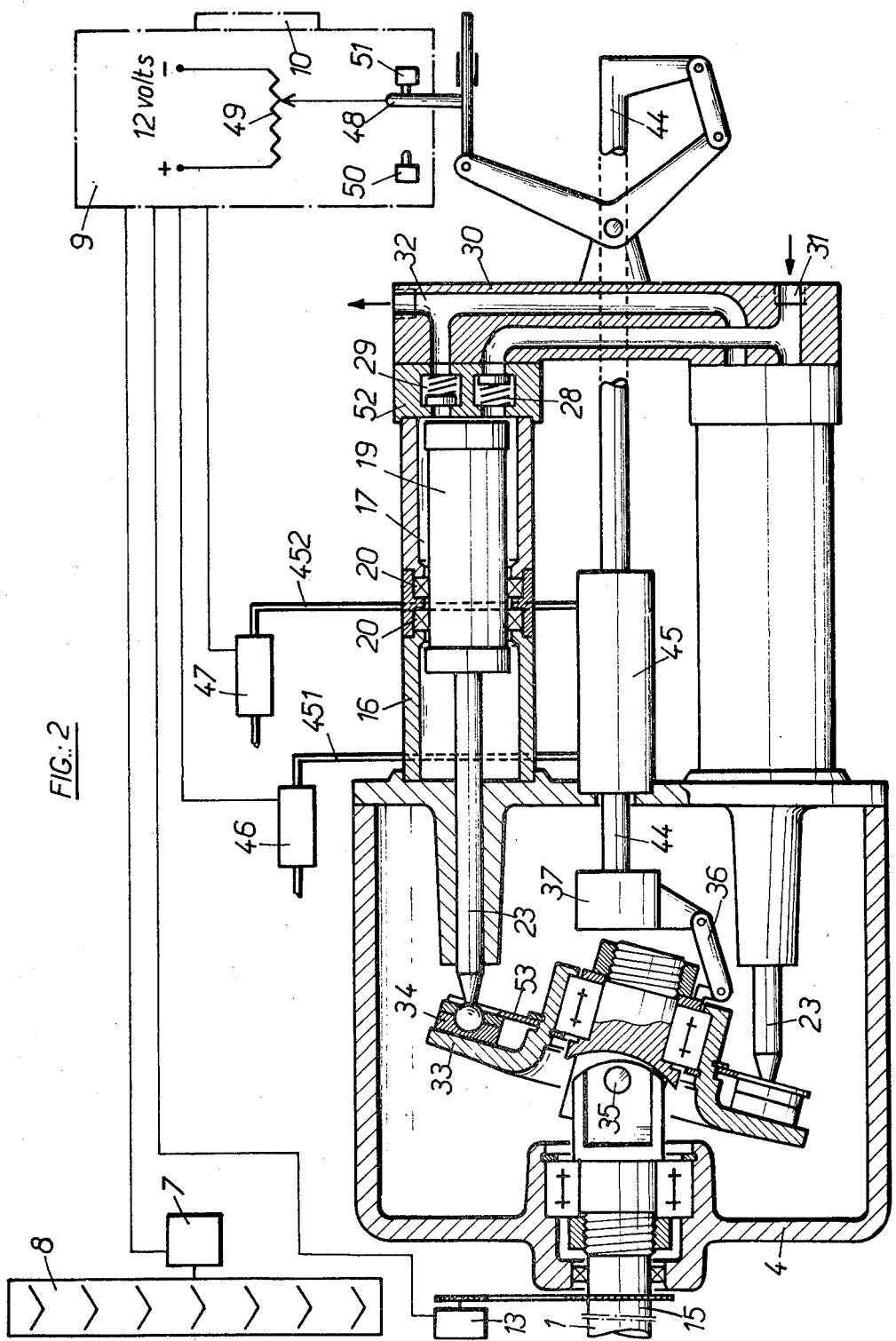
FIG. 2 is a schematic illustration of part of a plant comprising an adjustable-output pump devised according to an alternative embodiment of the invention.

In the alternative embodiment shown in FIG. 2, the shaft 15 of an adjustable-output pump 4 is driven from the power take-off 1 of a tractor (not shown). The speed may vary according to the rotation speed of the engine driving the tractor which supports or tows the spraying plant (likewise not shown).

Pump 4 comprises fixed barrels 16 in which are formed parallel and equidistant chambers 17 through each of which is slidable a piston 19.

Leaktightness is ensured by sealing rings 20. The piston rod 23 is guided through the pump body.

At the end of each chamber is a valve box 52, there being as many such valve boxes as there are pistons. The valve boxes include suction and discharge valves 28 and 29 respectively, and each is capped by a tract 30 formed with a passage 31 interconnecting all the suction valves and a passage 32 interconnecting all the discharge valves.

The pistons are driven in their delivery strokes by a swashplate 33 bearing against their rods through pads 34 and in their suction strokes by a return plate 53 fast with the swashplate.

Swashplate 33 is supported on the pump shaft 15 for rocking motion about a transverse fulcrum-pin 35. Its skewness can be adjusted by a link 36 which is actuated by a rotatable sleeve 37 fixed to the stem of a jack 45.

Movement of jack 45 is controlled by two electrically operated valves 46 and 47 mounted on pipes 451 and 452 which communicate the jack with an auxiliary source of fluid under pressure, such as the hydraulic generator of the tractor. Said valves are themselves controlled by a tacho-generator 7 driven by a wheel 8 the rotation speed of which is proportional to the rate of advance of the spraying plant, in a manner similar to that described with reference to FIG. 1.

Through the agency of a kinematic train which faithfully describes the motion of swashplate 33, the stem 44 is connected to a slide 48 of a potentiometer 49 forming part of an electronic regulator 9 which is likewise similar to the one described with reference to FIG. 1. Slide 48 is movable between two contact switches 50 and 51 which set the minimum and maximum pump outputs.

Tacho-generator 7 applies pulses to electrically operated valves 46 and 47, which in turn activate the jack so as to set the skew angle of swashplate 33 to suit the required output.

Potentiometer 49, which is associated to the tacho-generator 13 driven by shaft 15 in a manner similar to that described with reference to FIG. 1, allows checking that the pulses delivered by the wheel-driven tacho-generator have had the required effect on the swashplate, while regulating device 9 corrects the skewness of the swashplate if necessary.

The pump 4 can be regulated for constant pressure by any convenient servo control means.

As in the embodiment described with reference to FIG. 1, control means 10 allow adjusting the output per unit area to be provided by the plant.

Whether in one or the other of the forms of embodiment hereinbefoe described, or in possible other embodiments, the present invention is applicable to spraying plants utilizing multiple spray-rails. With such plants, it may be necessary to cut off the supply to one or more individual rails, for instance in order to complete processing of a field.

This invention enables this to be done with the remaining operative rail or rails whilst retaining constancy of output per unit area.

In order to ensure an output proportional to the rate of advance, the electronic regulator receives four separate data:

the voltage from tacho-generator 7 driven by the feeler wheel;

the voltage from monitoring tacho-generator 13 (embodiment shown in FIG. 1) or the voltage determined by the association of potentiometer 49 with the monitoring tacho-generator 13 (embodiment shown in FIG. 2), the output per unit area set by control means 10;

and the operative spray-rail length.

In the example depicted in FIGS. 3 and 4, the multiple spray-rail 60 consists of a number of individual rails — such as five rail sections 601, 602 . . . 605 — upon which are mounted spray nozzles. The supplies to the several rail sections are controlled by electrically operated valves 611, 612 . . . 615, respectively, connected into a conduit which communicates with the pump in the spraying plant.

The electrically operated valves are connected in parallel to an electric power line 62 having branches 621, 622 . . . 625, and associated to them in electronic regulating device 9 is a potentiometer 63 having a common adjustment trunk 630 and five resistors in series 631, 632 . . . 635 respectively associated to the branches 621 through 625, whereby dual switches 641, 642 . . . 645 respectively allow either switching in the relevant resistor when the corresponding branch is cut out or switching it in when the electrically operated valve is energized.

Switching in a resistor causes less pronounced skew in the swashplate of hydraulic generator 2 (in the plant depicted in FIG. 1) or in pump swashplate 33 (in the case of the plant in FIG. 2) and a consequent reduced output from pump 4, whereby the spraying plant operates for the desired spraying output per unit area with the individual spray-rails or rail sections remaining operative.

In the configuration shown in FIG. 3, only rail section 605 is discharging, the resistors 631, 632, 633 and 634 being on line and resistor 635 being short-circuited.

In the configuration portrayed in FIG. 4, all the rail sections are discharging, their respective electrically operated valves being open and all the resistors short-circuited.

This invention offers numerous advantages, including the following seven in particular:

the power, that is to say the spraying plant output or pressure, is in no way limited by wheel adhesion to the ground, enabling the plant to provide an output (volume per unit area) proportional to the rate of advance irrespective of the working pressure;

the output furnished by the pumps, i.e. the power corresponding thereto, is limited to what is needed and no more, so that there is no waste of energy;

the force required of the wheel monitoring the rate of advance is for all practical purposes insignificant; all that is needed is electric current of very low power, making it possible to have recourse to a single "feeler" wheel; the invention can thus readily be applied to supported spraying systems;

adjustment of the volume per unit area to be sprayed is instantaneous and merely involves setting a directly rotating selector graduated in liters per unit area; this is a decisive improvement over prior art spraying plants;

the system is foolproof, for not only does spraying cease when the tractor stops and is interdicted when the tractor is manoeuvering in reverse, but any speed in excess of the capacity of the pumps, i.e. which prevents the selected output figures from being observed, can easily be detected by causing the triggering of a warning signal such as a red warning light on the dashboard or by activating an audible warning device;

an auxiliary device controlled by a lever permits spraying while stationary, for instance in order to test or rinse out the spraying system, it being additionally possible to interrupt the spraying while on the move by merely breaking the electric control circuit;

the invention can be carried into practice using mass-produced hydraulic or electronic components, of the kind used notably in the machine-tool art, the interchangeability and above all the reliability of these components being fully assured without intervention by specialists.

It goes without saying that changes and substitutions of parts may be made in the exemplary embodiments hereinbefore described without departing from the scope of the invention as set forth in the appended claims.

I claim:

1. A mobile spraying plant, which comprises multiple spray heads disposed end to end in substantial alignment, a feeding pump means, means for delivering the spray product output of said feeding pump means to said spray heads, valve means associated with each individual spray head by which the flow of spray product can be shut off and one or more individual spray heads thus rendered inoperative as desired, regulating means operative to decrease the output of said pump means to match the pump output to the number of individual spray heads rendered operative, thereby to ensure that the spraying rate per unit area is maintained constant whatever such number may be, wherein the feed to each individual spray head is controlled by an electrically operated valve, and said regulating means comprises, in respect of each electrically operated valve, an element which is inoperative when that valve is open and operative when it is closed.

2. A plant according to claim 1, wherein said element is a resistor, the resistors associated to the several electrically operated valves being series-connected into a potentiometer upon which the pump output setting is dependent.

3. A plant according to claim 2, wherein each electrically operated valve and its resistor are controlled by a dual switch for either switching in the valve and short-circuiting the resistor or switching out the valve and switching in the resistor.

4. A mobile spraying plant as claimed in claim 2, in which the regulation means includes also a control means for manually varying the output of said pump.

5. A mobile spraying plant as claimed in claim 4, in which the manual control means comprises said potentiometer, the setting of which regulates the pump output.

6. A mobile spraying plant as claimed in claim 5, in which said regulating means comprises separate resistors for each valve means and means for switching said resistors in and out of circuitry as said valves are opened and closed.

7. A mobile spraying plant as claimed in claim 6, in which said resistors are in series with said potentiometer when the corresponding valve is closed, and out of circuity when it is open.

8. A mobile spraying plant as claimed in claim 7, in which said resistor is short circuited when the valve with which it is associated is opened.

9. A mobile spraying plant comprising in combination:

a spraying device including a plurality of elongated spray heads disposed end to end in substantial alignment;

a variable output feeding pump having an input port and an output port;

a supply tank;

conduit means for delivering spray liquid to said input port;

second conduit means for delivering the output of said pump to said spray heads;

individual valve means associated with each spray head whereby any one spray head is out of operation when the valve regulating the particular spray head is closed; and, regulating means for varying the output of said pump in proportion to the speed of said plant and in proportion to the number of spray heads in operation, thereby to ensure that the quantity of products sprayed per unit of surface is maintained constant independent of the speed of the said plant and independent of the number of said spray heads in operation; said regulating means being independent of said pump and said first and second conduit means, whereby the amount of spray liquid passing through said pump is the same as the amount delivered from said supply tank to said spray heads.

* * * * *